United States Patent
Huang (10) Patent No.: US 6,604,205 B1
(45) Date of Patent: Aug. 5, 2003

(54) SYSTEM AND METHOD FOR STATE SYNCHRONIZATION

(75) Inventor: Andrew J. Huang, Boise, ID (US)

(73) Assignee: Hewlett-Packard Development Co., L.P., Houston, TX (US)

( * ) Notice: Subject to any disclaimer, the term of this patent is extended or adjusted under 35 U.S.C. 154(b) by 0 days.

(21) Appl. No.: 09/499,320

(22) Filed: Feb. 7, 2000

(51) Int. Cl.[7] .................. G06F 1/12; G06F 12/00; G06F 15/16
(52) U.S. Cl. .................. 713/400; 707/201; 709/200
(58) Field of Search .................. 713/400; 707/8, 707/10, 201; 709/200, 237

(56) References Cited

U.S. PATENT DOCUMENTS

| | | | | |
|---|---|---|---|---|
| 5,117,351 A | * | 5/1992 | Miller | 707/10 |
| 5,924,096 A | * | 7/1999 | Draper et al. | 707/10 |
| 5,926,816 A | * | 7/1999 | Bauer et al. | 707/8 |
| 5,946,689 A | * | 8/1999 | Yanaka et al. | 707/10 |
| 5,974,429 A | * | 10/1999 | Strub et al. | 707/203 |
| 5,977,890 A | * | 11/1999 | Rigoutsos et al. | 341/55 |
| 6,247,059 B1 | * | 6/2001 | Johnson et al. | 709/237 |
| 6,330,568 B1 | * | 12/2001 | Boothby et al. | 707/201 |
| 6,356,623 B1 | * | 3/2002 | Le Van Suu | 379/24 |
| 6,453,438 B1 | * | 9/2002 | Miller et al. | 714/749 |
| 6,493,727 B1 | * | 12/2002 | Huang et al. | 707/201 |

* cited by examiner

*Primary Examiner*—Thomas Lee
*Assistant Examiner*—Chun Cao (57) ABSTRACT

A system and method are provided for maintaining state synchronization between a primary device and a secondary device. The present method includes the steps of generating a sequence identifier in the primary device, attaching the sequence identifier to a message in the primary device, transmitting the message and the sequence identifier attached thereto to the secondary device, and storing the sequence identifier in the secondary device as a secondary sequence identifier. In addition, the method includes the step of comparing a secondary sequence identifier from the secondary device with the sequence identifier in the primary device to detect a lost message.

9 Claims, 5 Drawing Sheets

SYSTEM AND METHOD FOR STATE SYNCHRONIZATION

TECHNICAL FIELD

The present invention is generally related to the field of computer state control, and, more particularly, is related to a system and method for state synchronization between at least two data handling devices.

BACKGROUND OF THE INVENTION

Technology has become pervasive in nearly all aspects of society. For example, the explosion in digital computing devices has changed the way people live and work. For example, personal computers have become commonplace in homes and in businesses. This computer technology has opened new avenues of communications such as email and other data communications that has provided unprecedented availability to information, for example, on the world wide web (www) of the Internet. In the workplace, for example, computer technology has facilitated telecommuting and other conveniences where employees may work at home and have full access to office computer systems, etc.

With the current mobility of systems, situations arise in which two or more devices are employed to accomplish a particular task(s). For such systems to work in tandem, often information is passed therebetween that is employed to perform the various tasks. This can create a problem in that information may be lost in transit. Consequently, a transmitting device may operate under the assumption that the receiving device has received all transmitted information when is not the case. Thus, the state of the receiving device may not be in a current state for proper operation in light of the current state of the transmitting device.

SUMMARY OF THE INVENTION

In light of the foregoing, a system and method are provided for maintaining state synchronization between a primary device and a secondary device. The method of the present invention comprises the steps of generating a sequence identifier in the primary device, attaching the sequence identifier to a message in the primary device, transmitting the message and the sequence identifier attached thereto to the secondary device, and storing the sequence identifier in the second device. In addition, the present method may optionally include the step of comparing a transmitted sequence identifier from the secondary device with the sequence identifier in the primary device to detect a lost message.

In another embodiment of the present invention, a system is disposed in a primary device for maintaining state synchronization between a primary device and a secondary device. In this regard, the system includes a processor electrically coupled to a local interface and a memory electrically coupled to the local interface. Stored on the memory and executed by the processor is primary sequencing logic. The primary sequencing logic includes logic to generate a sequence identifier, logic to attach the sequence identifier to a message, where the message and the sequence identifier are to be transmitted to the secondary device, and logic to store the sequence identifier for future comparison with sequence identifiers received from the secondary device. Alternatively, the foregoing system may also be implemented in a dedicated logical circuit rather than the processor circuit as described above.

In addition, the present invention provides for a system in a secondary device for maintaining state synchronization between a primary device and a secondary device. In this regard, the system comprises a processor electrically coupled to a local interface and a memory electrically coupled to the local interface. Stored in the memory and executed by the processor is secondary sequencing logic. The secondary sequencing logic includes logic to detect a receipt of a message and a sequence identifier attached thereto from the primary device, logic to store the sequence identifier, and logic to transmit the sequence identifier to the primary device in response to a received state request message from the primary device. Alternatively, the aforementioned system may also be implemented in a dedicated logical circuit rather than the processor circuit as described above.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
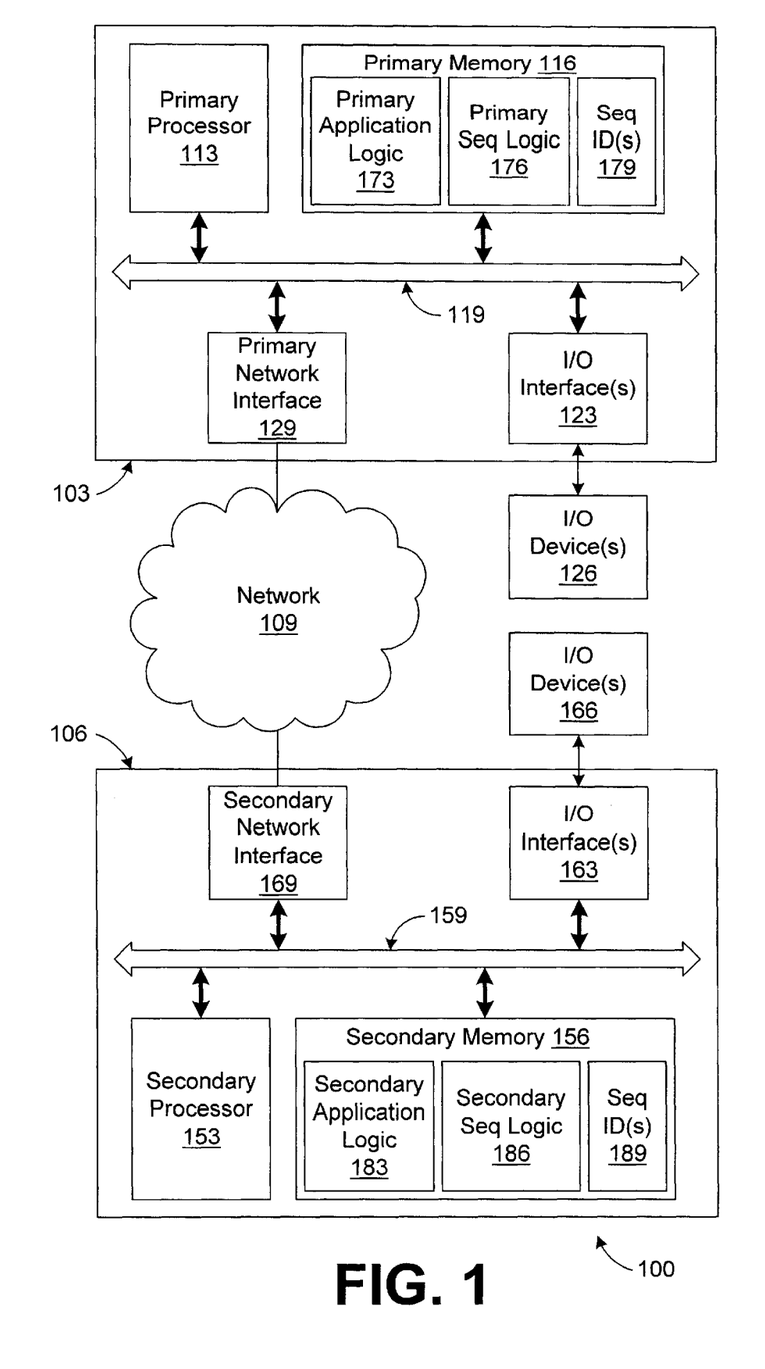
FIG. 1 is a block diagram of a sequencing system according to an embodiment of the present invention.

With reference to FIG. 1, shown is a sequencing system 100 for state synchronization according to the present invention. The sequencing system 100 includes a primary device 103 and a secondary device 106 that are in electrical communication via a network 109. The primary and secondary devices 103 and 106 may comprise, for example, computer systems or other processor based circuits. The primary device 106 includes a primary processor 113 and a primary memory 116, both of which are electrically coupled to a local interface 119. The local interface 119 may comprise, for example, a data bus(es) and a control bus(es).

The primary device 103 is linked to the network 109 via a primary network interface 129 that makes data from the network 109 available on the local interface 119 and vice versa. Also, the primary device 103 also includes one or more input/output interfaces 123 that provide a link between one or more input/output devices 126 and the local interface 119.

The secondary device 106 includes a secondary processor 153, a memory 156 that are both electrically coupled to a local interface 159. The secondary device 106 also includes one or more input/output interfaces 163 that couples one or more input/output devices 166 to the local interface 159. The secondary device 106 also includes a secondary network interface 169 that[ ]links the network 109 to the local interface 159.

Note that the memories 116 and 156 may comprise any suitable volatile and/or non-volatile memory devices. These devices include, for example, random access memory (RAM), read-only memory (ROM), a hard drive, a combination compact disk drive with a compact disk, a combination floppy disk drive with a floppy disk, or other suitable data storage device. With respect to the memories 116 and 156, the term "volatile" refers to those memory devices that do not maintain data during a loss of power, whereas the term "nonvolatile" refers to those devices that maintain data during a loss of power.

On the input side, the input/output (I/O) devices 126 and 166 of the primary and secondary devices 103 and 106 may comprise, for example, keyboards, keypads, mice, microphones, or other suitable input devices. On the output side, the input/output devices 126 may comprise, for example, display devices such as cathode ray tubes (CRTs), liquid crystal displays, indicators, lights, light emitting diodes, printers, or other output devices. The network 109 may comprise local area networks (LANs), wide area networks (WANs), or any other suitable network. Alternatively, the network 109 may also be replaced by a direct digital link or other similar direct link.

The primary device 103 also includes primary application logic 173 that is stored on the memory 116 and executed by the primary processor 113. Also stored on the memory 116 are primary sequencing logic 176 and sequence identifiers 179 that are generated and manipulated by the sequencing logic 176 as will be discussed.

The secondary device 106 includes secondary application logic 183 that is stored on the memory 156 and executed by the secondary processor 153. In addition, secondary sequencing logic 186 is stored on the memory 156 along with secondary sequence identifiers 189 as will be discussed. Generally the secondary sequencing identifiers 183 are received from the primary device 103 and stored by the secondary device 106 as will be discussed. Generally, the primary and secondary sequencing logic 176 and 186 are executed in conjunction with the primary and secondary application logic 173 and 183 to ensure state synchronization between the primary and secondary devices 103 and 106. In particular, the primary and secondary application logic 173 and 183 operate in conjunction with each other to accomplish specific tasks. The primary and secondary application logic 173 and 183 may include a software package directed to a specific purpose. For example, the specific functionality of the primary and secondary application logic 173 may be the maintenance of a common database on both the primary and secondary devices 103 and 106 as described in U.S. Pat. No. 6,493,727 entitled, "System and Method for Synchronizing Databases" filed on even date which is incorporated herein by reference in its entirety. It is a characteristic of the primary and secondary application logic 173 and 183 that they work with each other and require that all communications therebetween be tracked to ensure that no messages are lost in transit.

Figure 2:
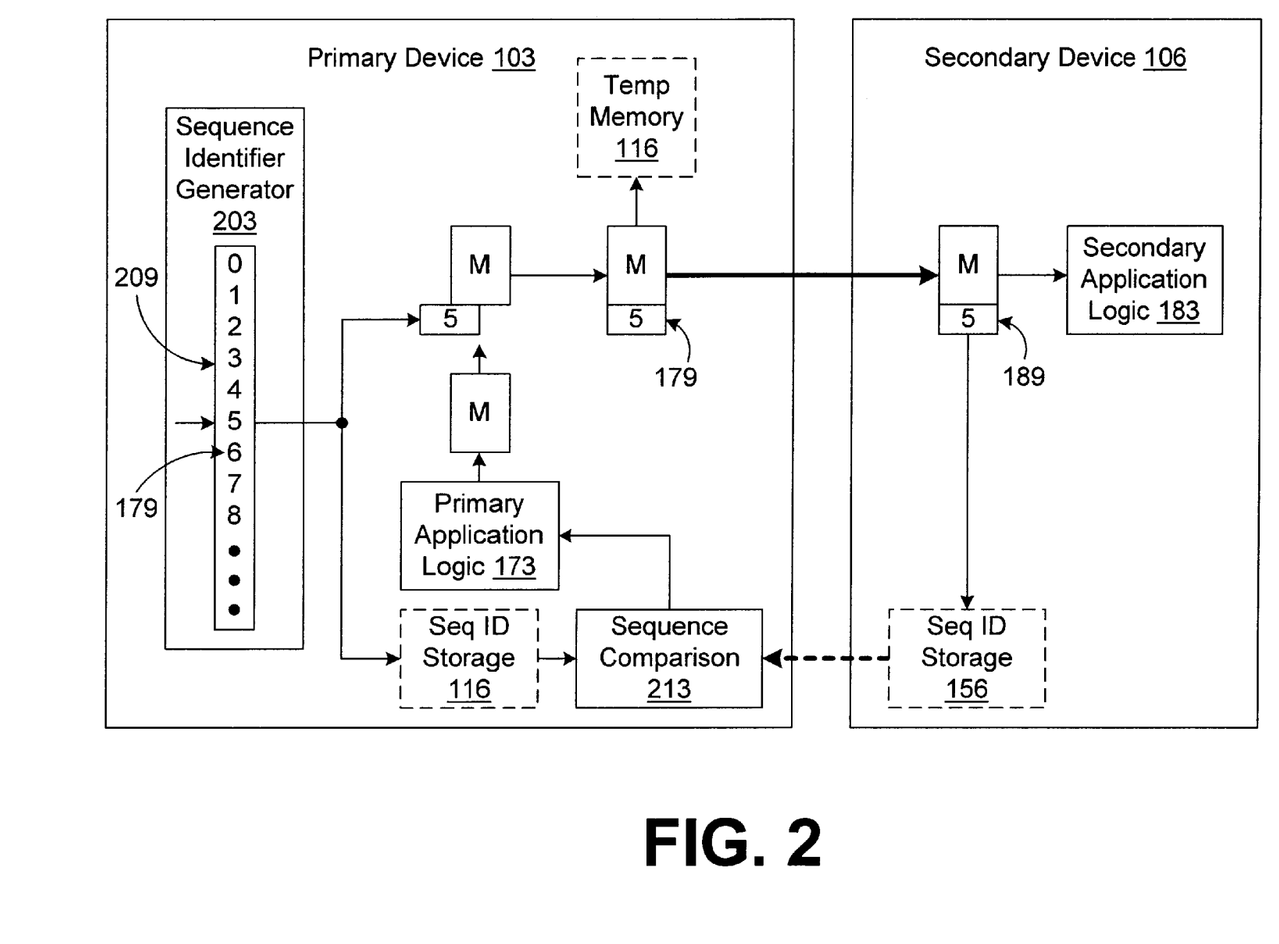
FIG. 2 is a block diagram illustrating the operation of the sequencing system of FIG. 1.

Turning then, to FIG. 2, shown is a block diagram of the primary and secondary devices of the sequencing system 100 according to an embodiment of the present invention. The primary device 103 includes a sequence identifier generator 203 that is employed to generate a number of sequence identifiers 179. The sequence identifier generator 203 generates the sequence identifier 179, for example, by obtaining the sequence identifier 179 from a sequence identifier alphabet 209 stored in the primary memory 116. Alternatively, the sequence identifier generator 103 may generate the sequence identifiers 179 by performing calculations according to a predefined seeded mathematical equation or relationship.

The primary application logic 173 generates a message M that is to be transmitted to the secondary device 106 that is employed in the operation of the secondary application logic 183. The sequence identifier generator 203 generates a sequence identifier 179 that is attached to the message M for transmission to the secondary device 106. The same sequence identifier 179 is stored in a predefined location in the memory 116. The message M and attached sequence identifier 179 are stored in temporary memory that may be, for example, a dedicated portion of the primary memory 116 (FIG. 1). Thereafter, the message M and attached sequence identifier 179 are transmitted to the secondary device 106 via the network 109 (FIG. 1). Note that multiple messages M with attached sequence identifiers 179 may be processed in this manner.

Upon receiving the message and attached sequence identifier 179, the secondary device 106 separates the message M and the sequence identifier 179 and applies the message M to the secondary application logic 183. The sequence identifier 179 becomes a secondary sequence identifier 189 and is stored in a predetermined location in the secondary memory 156. The message M alters the state of the secondary device 103 according to the application executed by the primary and secondary devices 103 and 106.

Based on predefined criteria inherent in the primary application logic 173, the primary device 103 transmits a state request signal to the secondary device 106 to determine the precise state of the secondary device 106. Upon receipt of the state request signal, the secondary device 106 responds by transmitting the secondary sequence identifiers 189 stored in the secondary memory 156 that accompanied the messages M from the primary device 103. The sequence identifiers 189 transmitted from the secondary device 106 are applied to sequence comparison logic 213. Likewise, all sequence identifiers 179 stored in the primary memory 116 are also applied to the sequence comparison logic 213. The sequence comparison logic 213 then determines whether the states of the primary device 103 and the secondary device 106 are synchronized. Synchronization generally exists when all messages are received by the secondary device 106 from the primary device 103. This is determined by examining whether all of the sequence identifiers 179 transmitted with the messages M were received and stored at secondary sequence identifiers 189.

The sequence comparison logic 213 then informs the primary application logic 173 whether the states of the primary and secondary devices 103 and 106 are synchronized. The primary application logic 173 then reacts to synchronize the states of the primary and secondary devices 103 and 106 accordingly, using the previously transmitted messages M and attached sequence identifiers 179 stored in the temporary memory location of the primary memory 116 when necessary.

Figure 3:
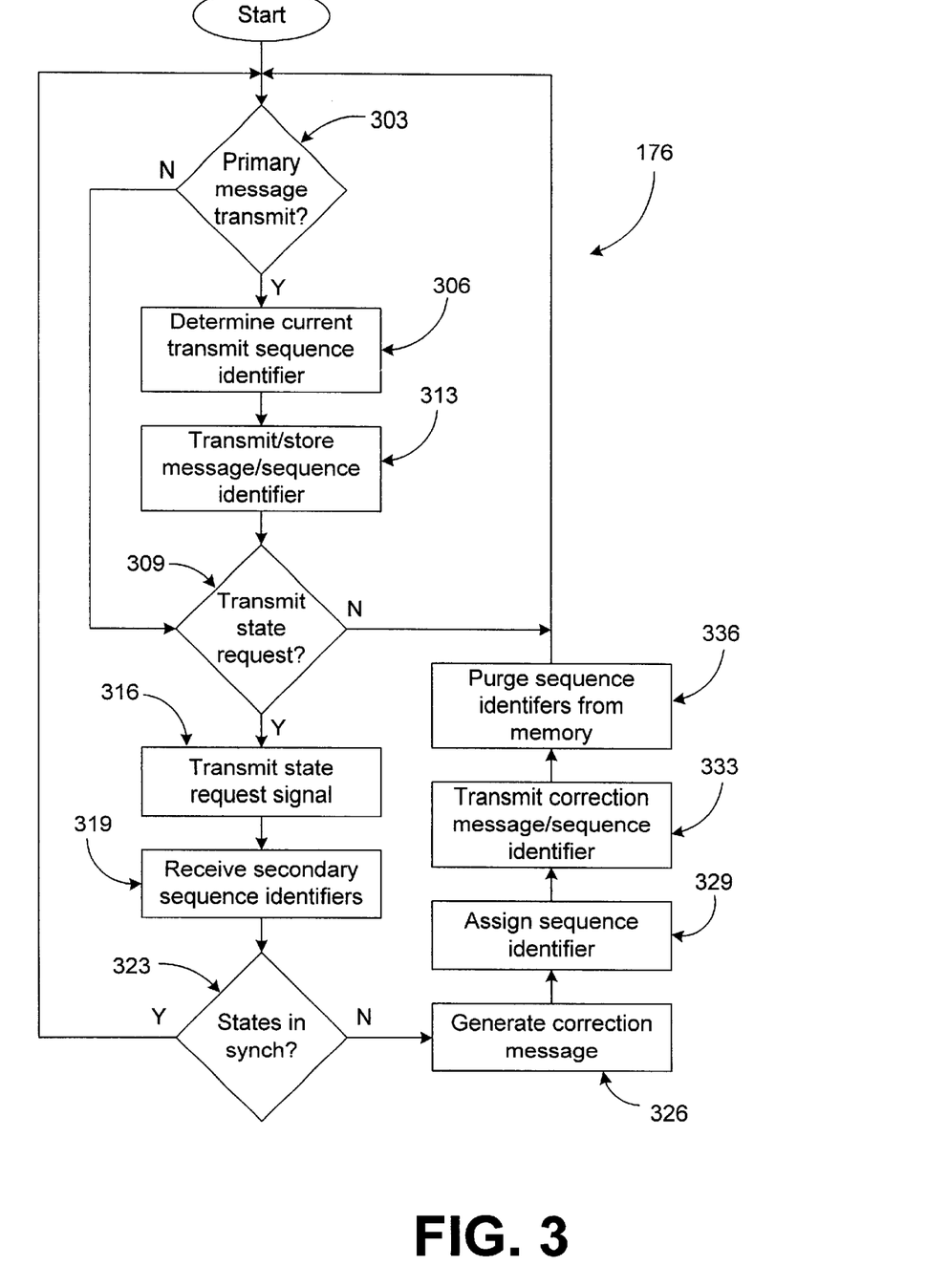
FIG. 3 is a flow chart of primary sequencing logic executed by the sequencing system of FIG. 1.

With reference to FIG. 3, shown is a flow chart of the primary sequencing logic 176 according to an embodiment of the present invention. Beginning at block 303, the primary sequencing logic 176 is informed by the application logic 173 that a message M has been generated to be transmitted to the secondary device 106. If there is such a message M, then the sequencing logic 176 progresses to block 306. If not, then the sequencing logic 176 skips to block 309. In block 306, the logic 176 generates a current transmit sequence identifier 179 (FIG. 2) and attaches it to the message M to be transmitted to the secondary device 103 (FIG. 1). The generated sequence identifier 179 is also stored in memory location 179. Thereafter, in block 313, the logic 176 transmits the message M and attached sequence identifier 179 to the secondary device 106.

From block 313, the logic 176 proceeds to block 309 or the logic 176 may have reached block 309 from block 303 as discussed previously. In block 309 the logic 176 determines whether a state request signal is to be transmitted to the secondary device 106 as mandated by the primary application logic 173. If no state request signal is to be transmitted, then the logic 176 reverts back to block 303. On the other hand, if a state request signal is to be transmitted, the logic 176 proceeds to block 316 in which the state request signal is transmitted to the secondary device 106. There after, in block 319, one or more secondary sequence identifiers 189 are received from the secondary device 106 in response to the state request signal.

Then, in block 323, the logic 176 compares the sequence identifiers 179 stored in the memory 116 with the secondary sequence identifiers 189 received from the secondary device 106 to determine if all of the messages M with the sequence numbers attached thereto were received by the secondary device 106. If all sequences numbers 179 match a particular secondary sequence number 189, then the states are in synchronization and the logic 176 reverts back to block 303. If there are some sequence numbers 179 that do not match a corresponding secondary sequence identifier 189, then the logic progresses to block 326.

In block 326, the primary application logic 173 generates a corrective message to send to the secondary device 106 to make up for the message M (FIG. 2) that was lost as indicated by the sequence number mismatch detected in block 323. Thereafter, in block 329 a current sequence identifier 179 is generated and attached to the corrective message so that its transmission to the secondary device 106 may be tracked in a similar manner to the messages M. In block 333, the corrective message and attached sequence identifier 179 are transmitted to the secondary device 106 and the logic 176. Then, in block 336 the sequence identifiers 179 are purged from the memory 116 as the state synchronization has taken place. The logic 176 then reverts back to block 303.

Figure 4:
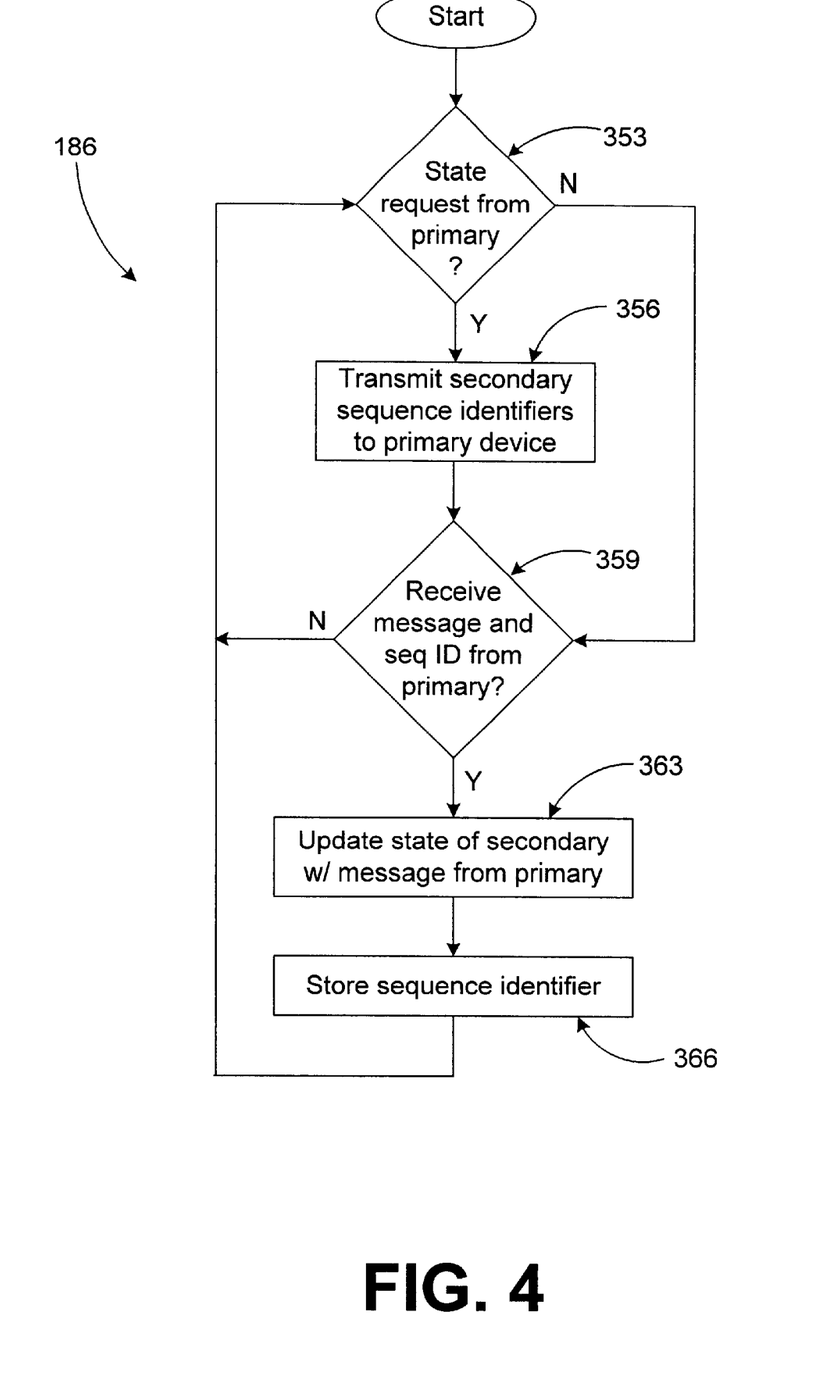
FIG. 4 is a flow chart of secondary sequencing logic executed by the sequencing system of FIG. 1.

Referring next to FIG. 4, shown is a flow chart of the secondary sequencing logic 186 according to another embodiment of the present invention. Beginning with block 353, the logic 186 detects the receipt of a state request signal from the primary device 106. If a state request signal is detected, the logic 186 progresses to block 356. If not, then the logic 186 skips to block 359. In block 356, the secondary device 103 transmits the secondary sequence flags 189 (FIG. 1) stored in the memory 156 (FIG. 1) to the primary device 103. Thereafter, the logic 186 progresses to block 359.

In block 359, the logic 186 detects whether a message M (FIG. 2) and attached sequence identifier 179 (FIG. 1) have been received from the primary device 103. If no such message is received, the logic 186 reverts back to block 353. If a message and attached sequence identifier 179 are received in block 359, then the logic 186 progresses to block 363 in which the message M is supplied to the secondary application logic 183 to update the state of the secondary device 106 accordingly. Then, in block 366, the sequence identifier 179 attached to the message M is stored in the memory 156 as a secondary sequence identifier 189. Thereafter, the logic 186 reverts back to block 353.

Figure 5A:
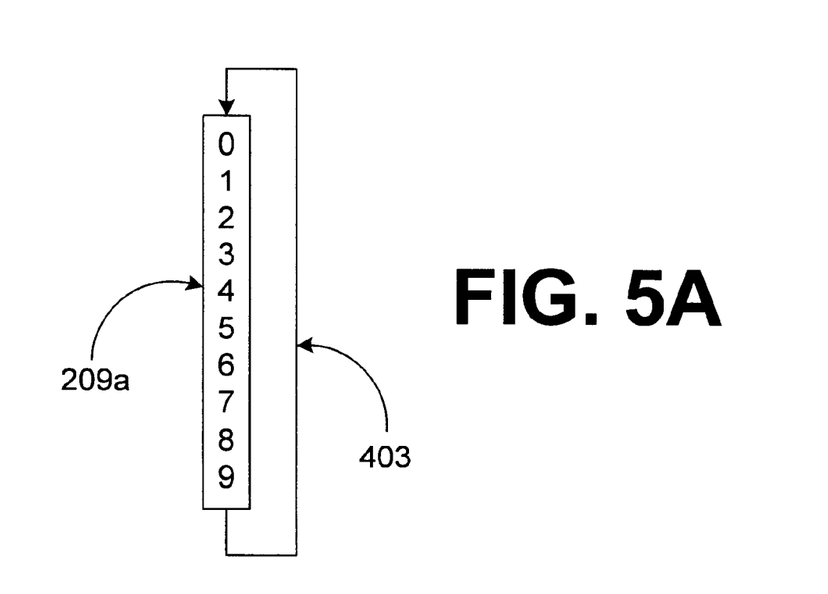
FIGS. 5A and 5B are block diagrams of sequence identifier alphabets that may be used in conjunction with the sequencing system of FIG. 1.
Figure 5B:
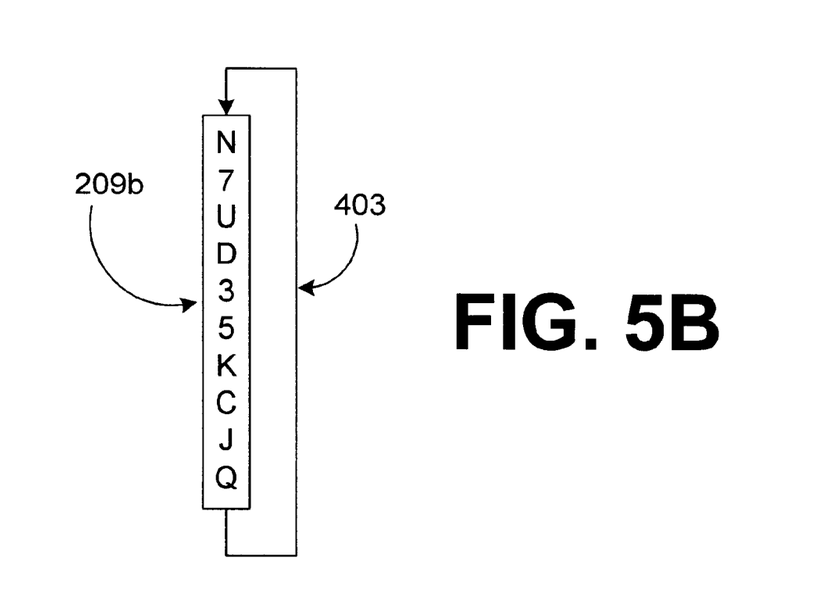

Finally, with reference to FIGS. 5A and 5B, shown are block diagrams of sequence identifier alphabets 209a and 209b from which sequence identifiers 179 may be generated. The alphabet 209a is sequential and includes a wrap around feature 403. The wrap around feature 403 allows the same string of variables to be employed multiple times and prevents the necessity of continually creating new sequence identifiers 179. Essentially a pointer identifies a current sequence identifier that is accessed when needed. This may necessitate that the state request signal be transmitted at a frequency that prevents a sequence identifier from being used twice before it is purged from the memories 116 and 156 (FIG. 1). Alternatively, the alphabet 209b shows sequence identifiers 179 that are in a random sequence order that may be employed as well.

In addition to the foregoing discussion, the logic 176 and 186 of the present invention can be implemented in hardware, software, firmware, or a combination thereof. In the preferred embodiment(s), the logic 176 and 186 is implemented in software or firmware that is stored in a memory and that is executed by a suitable instruction execution system. If implemented in hardware, as in an alternative embodiment, the logic 176 and 186 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Also, the flow charts of FIGS. 3 and 4 show the architecture, functionality, and operation of a possible implementation of the logic 176 and 186. In this regard, each block represents a module, segment, or portion of code, which comprises one or more executable instructions for implementing the specified logical function(s). It should also be noted that in some alternative implementations, the functions noted in the blocks may occur out of the order noted in FIGS. 3 or 4. For example, two blocks shown in succession in FIGS. 3 or 4 may in fact be executed substantially concurrently or the blocks may sometimes be executed in the reverse order, depending upon the functionality involved.

Finally, the logic 176 and 186, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within this disclosure and within the scope of the present invention.

What is claimed is:

1. A method for maintaining a state synchronization between a primary device and a secondary device, comprising the steps of:

generating a number of sequence identifiers in the primary device;

attaching each of the sequence identifier to a respective one of a number of messages in the primary device;

transmitting each of the messages and the sequence identifiers attached thereto to the secondary device;

storing the sequence identifiers in the secondary device as a respective number of secondary sequence identifiers;

temporarily storing each of the messages and the sequence identifiers attached thereto in a memory in the primary device when the messages and the sequence identifiers attached thereto are transmitted to the secondary device;

transmitting a state request signal from the primary device to the, secondary device;

receiving the secondary sequence identifiers in the primary device, the secondary sequence identifiers being transmitted by the secondary device to the primary device in response to the state request signal; and identifying sequence identifiers that do not match any one of the secondary sequence identifiers in the primary device to detect a lost message.

2. The method of claim 1, further comprising the step of purging one of the messages and one of the sequence identifiers from the memory.

3. A system in a primary device for maintaining a state synchronization between a primary device and a secondary device, comprising:

a processor electrically coupled to a local interface;

a memory electrically coupled to the local interface; and a primary sequencing logic stored on the memory and executed by the processor, the primary sequencing logic including:

logic to generate a number of sequence identifiers;

logic to attach each of the sequence identifiers to a respective one of a number of messages, the messages and the sequence identifiers being transmitted to the secondary device;

logic to store the messages and the sequence identifiers attached thereto in the memory when the messages and the sequence identifiers attached thereto are transmitted to the secondary device;

logic to transmit a state request signal to the secondary device;

logic to store a number of secondary sequence identifiers received from the secondary device in response to the state request signal; and logic to identify ones of the sequence identifiers that do not match any one of the secondary sequence identifiers in the primary device to detect a lost message.

4. The system of claim 3, wherein the primary sequencing logic further comprises:

logic to generate a corrective message from one of the messages stored in the memory if the lost message is detected;

logic to attach a current sequence identifier to the corrective message; and logic to transmit the corrective message and the current sequence identifier attached thereto to the secondary device.

5. The system of claim 3, wherein the primary sequencing logic further comprises logic to purge one of the messages and one of the sequence identifiers from the memory.

6. A system in a primary device for maintaining a state synchronization between a primary device and a secondary device, comprising:

means for generating a number of sequence identifiers;

means for attaching each of the sequence identifiers to a respective one of a number of messages, the messages and the sequence identifiers being transmitted to the secondary device;

means for storing the messages and the sequence identifiers attached thereto in a memory when the messages and the sequence identifiers attached thereto are transmitted to the secondary device;

means for transmitting a state request signal to the secondary device;

means for storing a number of secondary sequence identifiers received from the secondary device in response to the state request signal; and means for identifying ones of the sequence identifiers that do not match any one of the secondary sequence identifiers to detect a lost message.

7. The method of claim 1, further comprising the steps of:

generating a corrective message to the secondary device if the lost message is detected;

generating a current sequence identifier;

attaching the current sequence identifier to the corrective message; and transmitting the corrective message and the current sequence identifier attached thereto to the secondary device.

8. The system of claim 6, further comprising:

means for generating a corrective message from one of the messages stored in the memory when the lost message is detected;

means for attaching a current sequence identifier to the corrective message; and means for transmitting the corrective message and the current sequence identifier attached thereto to the secondary device.

9. The system of claim 6, further comprising means for purging one of the message and one of the sequence identifiers from the memory.

* * * * *

UNITED STATES PATENT AND TRADEMARK OFFICE
CERTIFICATE OF CORRECTION

PATENT NO.    : 6,604,205 B1
DATED         : August 5, 2003
INVENTOR(S)   : Andrew J. Huang It is certified that error appears in the above-identified patent and that said Letters Patent is hereby corrected as shown below:

<u>Title page, Item 54, and Column 1, Lines 1-2,</u>
Delete "SYSTEM AND METHOD FOR STATE SYNCHRONIZATION" and insert therefor -- SYSTEM FOR STATE SYNCHRONIZATION BETWEEN A PRIMARY DEVICE AND A SECONDARY DEVICE USING A SEQUENCE OF IDENTIFIERS TO DETECT LOST MESSAGE --

Signed and Sealed this

Twenty-sixth Day of July, 2005

JON W. DUDAS
*Director of the United States Patent and Trademark Office*